United States Patent [19]

Zwahlen

[11] 4,429,950
[45] Feb. 7, 1984

[54] BICYCLE PEDAL REFLECTOR

[76] Inventor: Helmut T. Zwahlen, 3 Canterbury Dr., Athens, Ohio 45701

[21] Appl. No.: 380,417

[22] Filed: May 20, 1982

[51] Int. Cl.³ .......................... G02B 5/12; G05G 1/14
[52] U.S. Cl. ...................................... 350/99; 350/97; 74/594.4
[58] Field of Search .................... 350/97, 99; 74/594.4

[56] References Cited

U.S. PATENT DOCUMENTS

| | | | |
|---|---|---|---|
| 385,074 | 6/1888 | Smith . | |
| 2,084,373 | 6/1937 | Anderson | 208/70 |
| 2,121,868 | 6/1938 | Gelder | 88/81 |
| 2,151,144 | 3/1939 | Penny et al. | 88/81 |
| 3,302,483 | 2/1967 | Golden et al. | 74/594.4 |
| 3,659,478 | 5/1972 | Pawsat et al. | 74/594.4 |
| 3,796,110 | 3/1974 | Hagenah | 74/594.4 |
| 3,797,912 | 3/1974 | Humlong | 350/99 |
| 3,800,623 | 4/1974 | Baginski | 74/594.4 |
| 3,877,726 | 4/1975 | Foster | 280/294 |
| 3,893,747 | 7/1975 | Nagel | 350/99 |
| 4,080,017 | 3/1978 | Meyer | 308/188 |
| 4,178,070 | 11/1979 | Thibodeau | 350/99 |

Primary Examiner—Bruce Y. Arnold
Assistant Examiner—William Propp
Attorney, Agent, or Firm—Barnes & Thornburg

[57] ABSTRACT

A reflector has a trapezoidal shape and is mounted to the pedal of a bicycle. The reflector is mounted on a front or rear facing pedal surface and extends downwardly below the pedal to provide a greater reflective surface area than previously provided by pedal reflectors without affecting the minimum tilt angle of the bicycle frame with respect to the ground. The reflector includes a proximal side adjacent to the crank of the bicycle when the reflector is mounted to the pedal and a bottom forming an acute angle with respect to the proximal side. The acute angle is generally equal to the minimum tilt angle of the bicycle.

18 Claims, 14 Drawing Figures

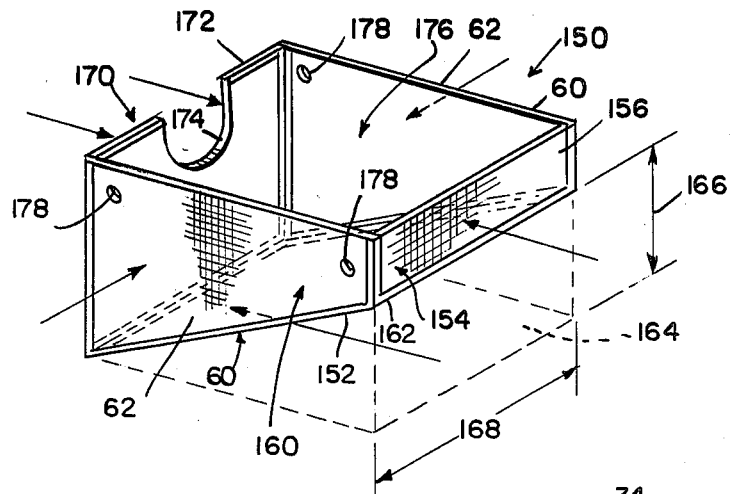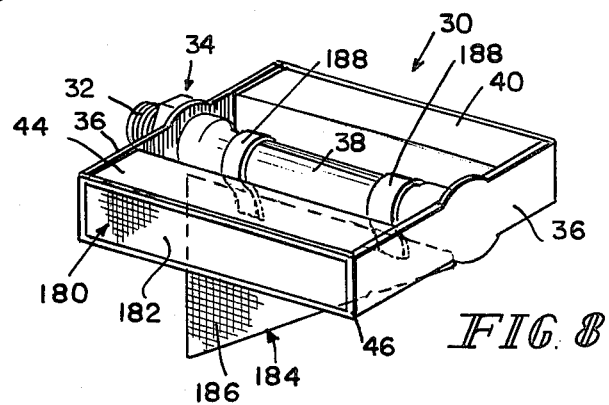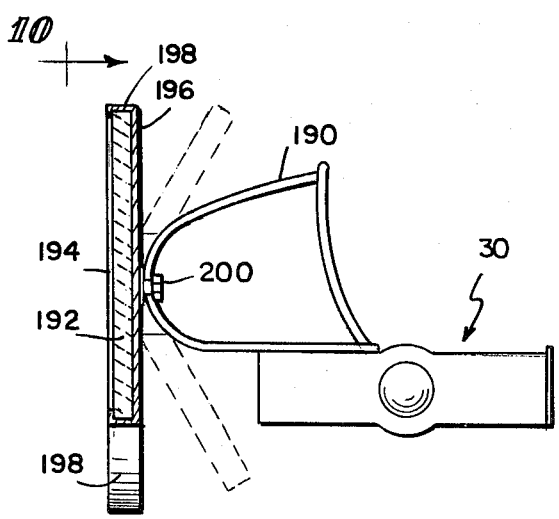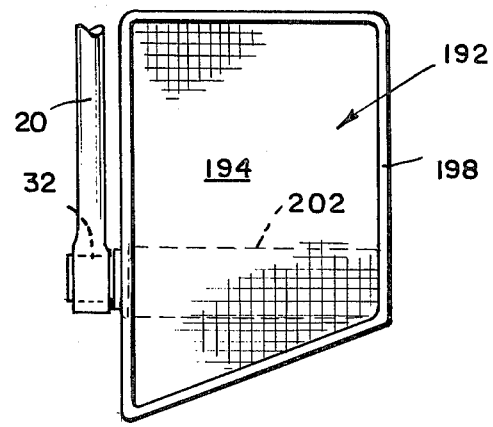

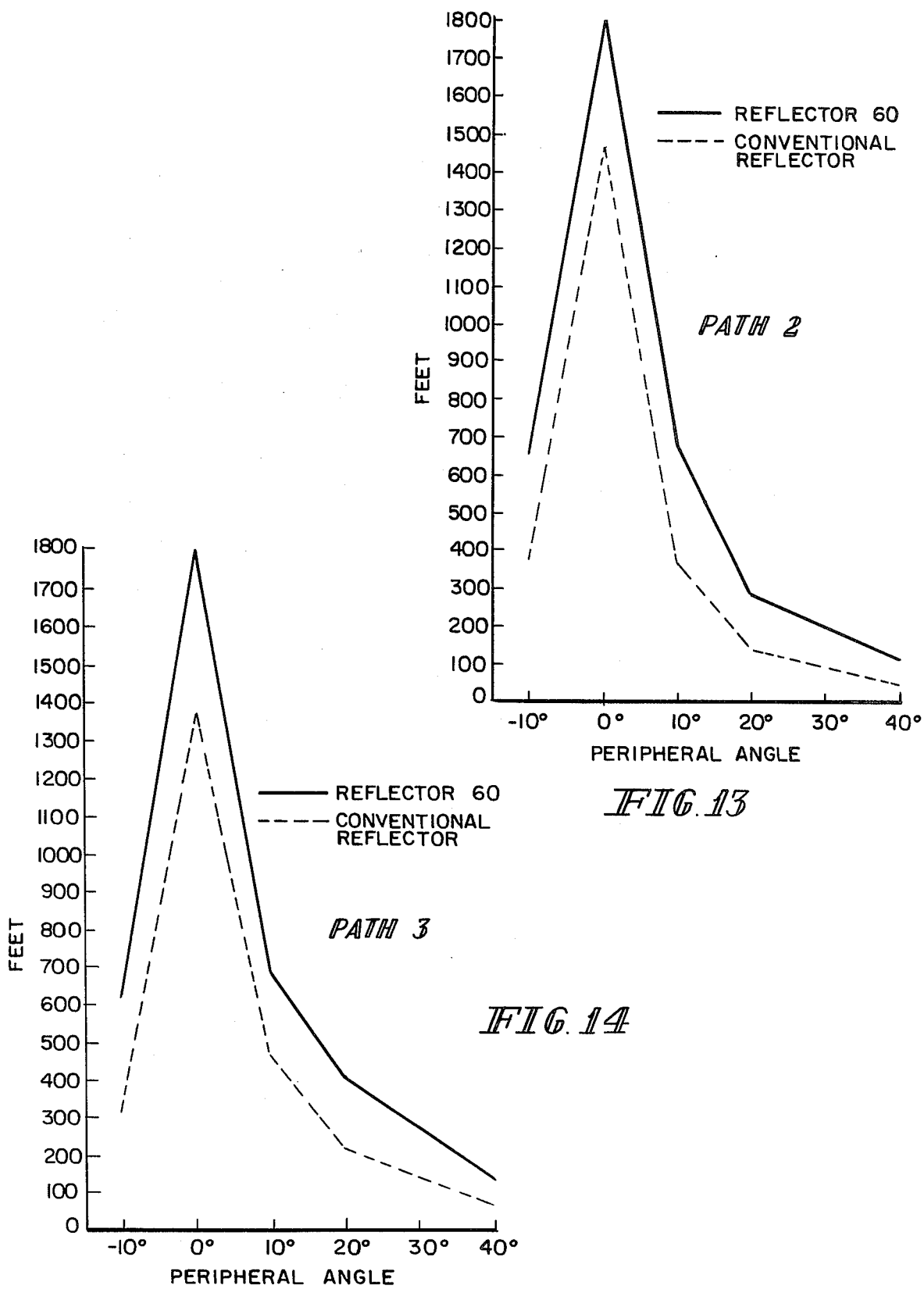

BICYCLE PEDAL REFLECTOR

The present invention relates to bicycle reflectors, and more particularly to a bicycle pedal reflector which provides a maximum reflective surface area without affecting the minimum tilt angle between the bicycle frame and the ground surface.

Various efforts have been made to develop reflective devices or other lighting systems for improving the visibility of a bicycle at night to an operator of a vehicle, such as a car or truck. For example, see U.S. Pat. Nos. 385,074; 2,084,373; 2,121,868; 2,151,144; 3,302,483; 3,659,478; 3,796,110; 3,797,912; 3,877,726; 3,800,623; 3,893,747; 4,080,017; and 4,178,070. It is well known that the safety of a bicycle rider at night is directly related to the ability of the driver of a vehicle to detect and recognize the presence of the bicycle. Some of the prior developments have been related to reflectors mounted on the pedal of the bicycle. In most of these prior developments, the reflective surface area of pedal reflectors has been limited to the area of various pedal surfaces. For example, some reflectors have been mounted to the front or rear tread of the pedal and have thus had a reflective surface area equal to or less than the rectangular surface area of the tread. With such conventional pedal reflectors, the heel and other parts of the rider's shoe or rotation of the pedal as the rider pedals the bicycle may create a barrier between a light beam and the reflective surface area resulting in less reflective ability. In instances where the reflective surface area has been made larger than the area of a pedal surface, the prior pedal reflectors have affected the minimum tilt angle of the bicycle with respect to the ground surface.

Reflectors mounted to the pedals of a bicycle are more advantageous than reflectors mounted to other parts of the bicycle. Pedal reflectors can be observed from the front and/or rear of the bicycle and are moved in a relatively small radius determined by the radius of the crank on the bicycle. The problem of visibility, detection and recognition of bicycles by vehicle operators is greatest when the vehicle headlights are on low beam. Headlights on high beam produce more light and the light is distributed a greater distance above the ground surface. Headlights on low beam are aimed at an angle of about 2° to 3° into the ground surface. Most night operation of vehicles is done with headlights on low beam. Thus, most of the light from the vehicle is directed toward the ground in front of the vehicle. Reflectors mounted 25 to 30 inches above the ground on a bicycle frame or other parts of the bicycle do not receive as much light from a headlight on low beam as a reflector mounted to a pedal close to the ground. While reflectors mounted on the wheels of a bicycle do periodically come close to the ground, they can only be observed if the bicycle is moving transverse to the direction of movement of the vehicle. In most situations, the vehicle is moving toward the bicycle, either from the front or the rear of the bicycle. Thus, reflectors on the bicycle wheels or reflective sidewall tires would not enable the operator of the vehicle to reliably detect and recognize the presence of a bicycle from the front or rear.

In addition to the relatively small reflective surface area of the conventional pedal reflector, the pedal reflectors have had shapes which are commonly used in other traffic or highway applications. Most prior pedal reflectors are either circular or rectangular. Furthermore, reflectors mounted to other portions of the bicycle have also been either circular or rectangular in shape. Thus, a circular or rectangular reflector does not immediately alert the observer to the fact that a bicycle is present. It would be advantageous to have a bicycle reflector with a distinct shape which would facilitate recognition of the presence of a bicycle.

These and other problems associated with conventional bicycle reflectors, and in particular pedal reflectors, are solved by the present invention. One object of the present invention is to provide a pedal reflector which, when mounted to the pedal, provides a maximum reflective surface area without affecting the minimum tilt angle of the bicycle with respect to the ground surface.

Another object of the present invention is to provide a pedal reflector having a distinct and easily recognizable shape for recognizing bicycles at close viewing distances.

A further object of the present invention is to provide a pedal reflector which can be detected and recognized by a vehicle operator at a greater distance than prior pedal reflectors.

In an illustrative embodiment of the present invention, a reflector for a pedal mounted to the crank of a bicycle comprises reflective means having a generally trapezoidal shape and mounting means for mounting the reflective means on the pedal so that the reflective surface area of the reflective means faces toward either the front or rear of the bicycle. The reflective surface area of the reflective means is greater than any front, rear, or side facing pedal surface. The reflective means includes a proximal side edge adjacent to the crank of the bicycle when the reflective means is mounted on the pedal and a bottom edge forming an acute angle with respect to the proximal side edge. The acute angle is generally equal to the minimum tilt angle between the plane of the frame of the bicycle and the ground surface. The minimum tilt angle of a bicycle is predetermined by the dimensions of the crank and pedal when the pedal is in its lowest position in the circular path of movement of the pedal. Thus, the shape of the reflector provides a maximum reflective surface area without affecting the minimum tilt angle of the bicycle.

In another illustrative embodiment of the present invention, a reflector for the pedal mounted to the crank of the bicycle comprises a first reflective member having a generally trapezoidal shape, a second reflective member having a generally trapezoidal shape, a third reflective member having a generally rectangular shape, and mounting means for mounting the reflective members on the pedal. Each of the first and second reflective members have proximal side edges adjacent to the crank when they are mounted in the pedal, a distal side edge, and a bottom edge forming an acute angle with respect to the proximal side edge. The third reflective member is connected to one of the edges of both the first and second reflective members, thereby providing front, rear, and side reflective surface areas on the pedal. Additional reflective members can be connected to edges of the first and second reflective members to provide additional side reflective surface areas. Thus, according to the present invention, maximum front, rear, and side reflective surface areas are provided without affecting the minimum tilt angle of the bicycle with respect to the ground surface.

Other features and advantages of the present invention will become apparent in view of the following detailed description of embodiments thereof exemplifying the best modes of carrying out the invention as presently perceived, which descriptions should be considered in conjunction with the accompanying drawings, in which:

FIG. 7 is a perspective view of another embodiment of a pedal reflector constructed according to the present invention;

FIG. 8 is a perspective view of a pedal assembly including another embodiment of a pedal reflector constructed according to the present invention;

FIG. 9 is a side view, partly cross-sectioned, of a pedal assembly and another embodiment of a pedal reflector shown attached to a toe clip mounted on the pedal assembly;

FIG. 10 is a front view of the pedal reflector shown in FIG. 9, taken generally along lines 10—10 of FIG. 9;

Figure 12:
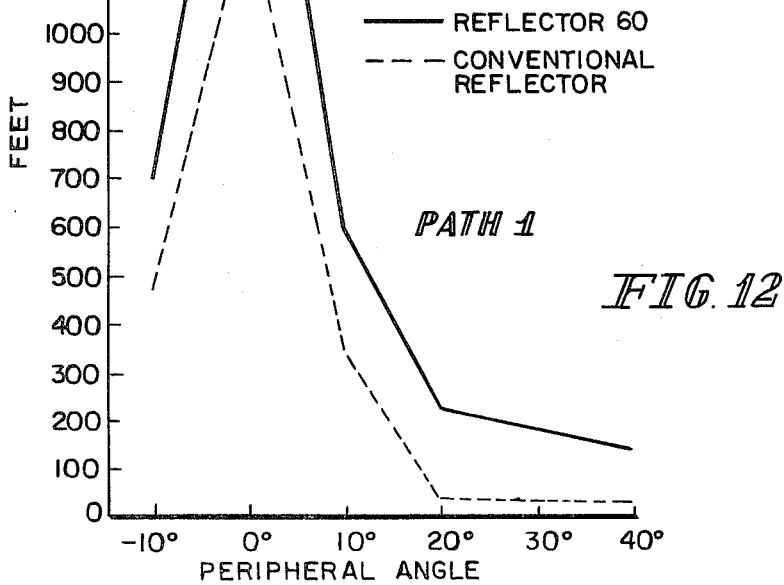
FIG. 12 is a graphic summary of a comparison between the mean detection distances from FIG. 12 in a first path in which reflectors and bicycles are presented to a vehicle operator at various heading angles of the vehicle.

FIG. 13 is a graphic summary of a comparison between mean detection distances from FIG. 12 in a second path in which reflectors and bicycles are presented to a vehicle operator at various heading angles of the vehicle; and FIG. 14 is a graphic summary of a comparison of mean detection distances from FIG. 12 in a third path in which reflectors and bicycles are presented to a vehicle operator at various heading angles of the vehicle.

Figure 1:
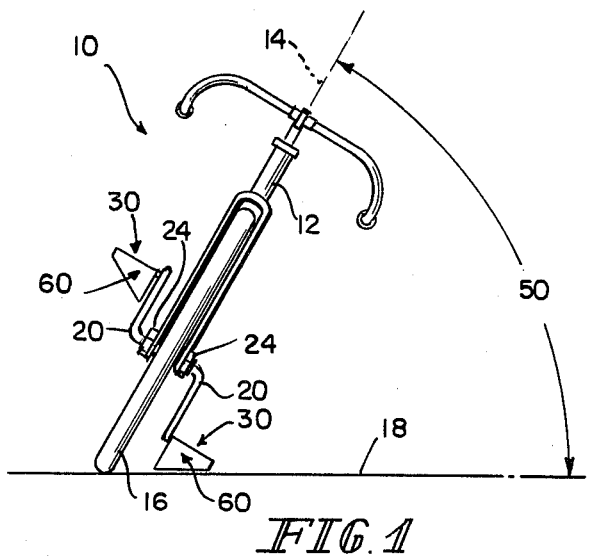
FIG. 1 is a front view of a bicycle tilted at its minimum tilt angle with respect to the ground surface showing pedal reflectors embodying the present invention.
Figure 2:
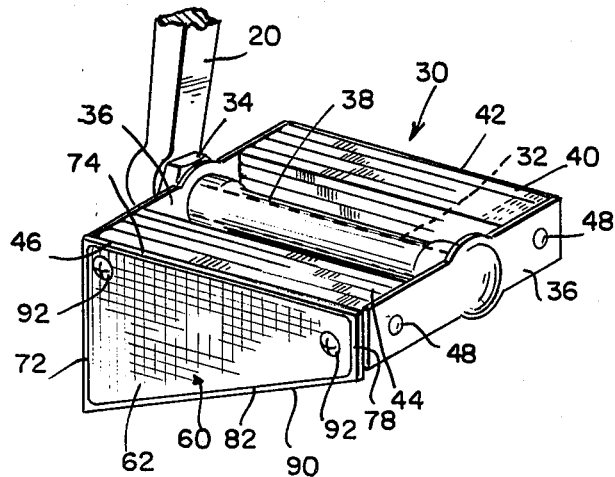
FIG. 2 is an enlarged perspective view of a bicycle pedal assembly including a pedal reflector embodying the present invention.

Referring to FIGS. 1 and 2, a conventional bicycle 10 or other similar means of transportation includes a frame 12 in generally a single plane 14. Wheels 16 are rotatably mounted to the frame 12 and engage the ground surface 18. When the frame 12 is in its normal upright position, the plane 14 is generally perpendicular to the ground surface 18 so that the angle between the frame 12 and the ground surface is generally 90°.

The bicycle 10 also includes a crank 20 rotatably mounted at point 24 to the frame 12. The crank 20 includes portions on both sides of the frame 12 extending in opposite directions in generally parallel relationship to the plane 14 of the frame 12. Pedals 30 are connected to the distal ends of the crank 20.

Referring more particularly to FIG. 2, each pedal 30 includes a pedal shaft 32, means 34 for mounting the shaft 32 to the crank 20, side frame members 36, and a spindle 38 having bearings (not shown) for rotatably mounting the side frame members 36 to the pedal shaft 32 in spaced parallel relationship to each other and in transverse relationship to the shaft 32. In the illustrative embodiment of pedal 30, the mounting means 34 for pedal shaft 32 includes external threads on the shaft and mating threads in an opening provided in the distal end of the crank 20. The pedal 30 further includes a rear tread or platform 40 having a rear facing surface 42 and a front tread or platform 44 having a front facing surface 46. Treads 40 and 44 are positioned between the side frame members 36 and mounted thereto by screws, rivets, or other mounting means 48.

As best seen in FIG. 1, when a bicycle enters a turn, the frame is tilted at an angle with respect to the ground 18 in the direction of the turn. The least angle at which the frame can tilt without the pedal 30 engaging the ground 18 in its lowest position is commonly referred to as the minimum tilt angle 50 between the plane 14 of the frame 12 and the ground surface 18. The minimum tilt angle 50 is determined by the combination of the length of the crank 20 and the length of the pedal shaft 32.

Pedal reflectors are desirable over reflectors mounted to other portions of the bicycle 10 because a large percentage of night driving is done with the use of headlights on low beam. Light projected from low-beam headlights is directed toward the ground in front of the vehicle. Thus, reflectors mounted high on the bicycle or worn by the rider of the bicycle receive very little light from a headlight on low beams. It is desirable that a pedal reflector not have an affect upon the minimum tilt angle 50 of the bicycle 10. It is also desirable that the pedal reflector have a maximum reflective surface area for detection by a vehicle operator. A pedal reflector 60 embodying the present invention provides a maximum reflective surface area on a bicycle pedal 30 without affecting the minimum tilt angle 50 of the bicycle 10 with respect to the ground surface 18. The pedal reflector 60 has a greater reflective surface area than prior pedal reflectors which do not affect the minimum tilt angle 50.

Figure 3:
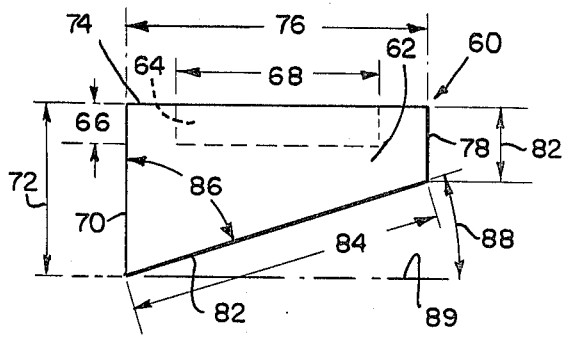
FIG. 3 is a diagrammatic view of a pedal reflector embodying the present invention.

Referring to FIG. 3, a reflector 60 embodying the present invention has a trapezoidal shape. The reflector 60 has a reflective surface area 62 which is greater than the reflective surface area 64 of reflectors heretofore mounted on the rear or front surfaces 42 or 46, respectively, of the treads 40 or 46, respectively, which did not affect the minimum tilt angle 50. Reflector 60 also has a reflective surface area 62 which is greater than any front, rear, or side surface of the pedal 30. As represented by the dotted lines in FIG. 3, the reflective surface area 64 of the conventional pedal reflector has had a rectangular shape. The rectangular reflective surface area 64 of the conventional pedal reflector typically has a height 66 of 0.375 inch and a length 68 of 2.50 inches. Thus, the effective reflective surface area 64 of the conventional pedal reflector has been approximately 1.0 square inch.

When the pedal reflector 60 embodying the present invention is mounted to either the rear 42 or front 46 facing surface of the pedal 30, it has a proximal (inside) edge 70. The edge 70 has a length of between 2.5 inches to 2.75 inches. The reflector 60 includes a top edge 74 having a length 76 of between 3.5 to 4.0 inches, a distal (outside) edge 78 having a length 80 of between 0.9 to 1.2 inches, and a bottom edge 82 having a length 84. The bottom edge 82 forms an acute angle 86 with respect to the proximal edge 70. The length 84 of edge 82 is determined by the lengths of the edges 70, 74, and 78, and may be calculated using the well-known formula for determining the length of the hypotenuse of a right triangle. In the preferred embodiment, angle 86 generally equals the minimum tilt angle 50 of the bicycle 10 with respect to the ground surface 18. Thus, the angle 88 between the bottom edge 82 and an imaginary horizontal line 89 in parallel relationship to the top edge 74 is generally equal to 90° minus the angle 86. In one embodiment, the minimum tilt angle 50 and angle 86 are generally equal to 60°. Angle 88 is therefore 30°. It will be appreciated that the minimum tilt angle 50, and thus the angle 86 will vary, depending upon the dimensions of the bicycle 10, crank 20, and pedal shaft 32. Thus, it is not intended for the angle 86 to be limited to any specific value, but it must be acute with respect to the proximal edge 70. Within the above-specified range of lengths for the edges 70, 74, and 78, reflector 60 has an effective reflective surface area 62 which is generally six times greater than the reflective surface area 64 of the conventional pedal reflector. This means that the operator of a vehicle gets approximately six times more light or illumination directed at his eyes when approaching a bicycle 10 equipped with pedal reflectors 60 embodying the present invention.

The reflective surface area 62 may be constructed in many different ways to achieve the greatest visibility or illumination of the reflector 60 at the widest range of heading angles relative thereto. In the preferred embodiment, the reflective surface area 62 includes amber wide-angle corner cubes (prismatic) designed to achieve an optimum photometric/optical/refractive coefficient. Generally speaking, such reflector design includes a multiple facet surface. It will be appreciated that other reflective surface materials and designs may be used without departing from the scope of the present invention.

The distinct trapezoidal shape of the reflector 60 not only provides a maximum reflective surface area 62 without affecting the minimum tilt angle 50 of the bicycle 10, but also facilitates recognition of the fact that a bicycle 10 is present. While round and rectangular reflectors are commonly used in traffic and highway applications, trapezoidal-shaped reflectors are seldom used. Thus, the trapezoidal shape is unique to the identification of a bicycle 10.

Various means for mounting the reflector 60 to the bicycle pedal 30 may be used. Preferably, reflectors 60 are mounted to the pedal 30 so that their reflective surface areas 62 face toward the front and/or rear of the bicycle 10. Thus, in one embodiment, the reflectors 60 are mounted to the rear facing surface 42 of the rear tread 40 and the front facing surface 46 of the front tread 44. It will be appreciated that a single reflector 60 may be mounted to just one of the rear or front facing surfaces 42 or 46, respectively, or that a reflector 60 may be mounted to both surfaces 42 and 46. In either case, the reflective surface area 62 is greater than the surface areas 42 or 46 and it extends downwardly below the pedal 30.

Figure 4:
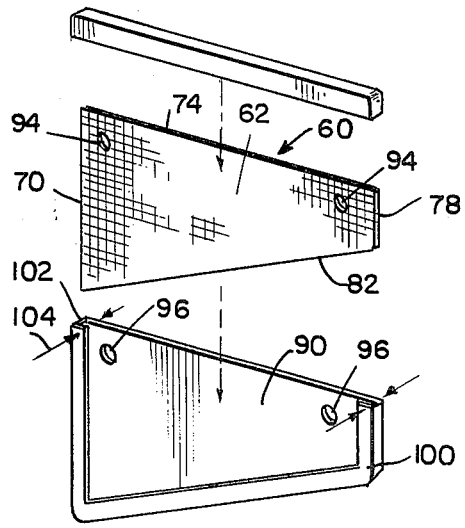
FIG. 4 is a perspective view of an embodiment of a protective frame for a pedal reflector embodying the present invention.

Referring to FIGS. 2 and 4, one embodiment of a means for mounting a reflector 60 to a tread 40 or 44 includes a plate 90 and attachment means 92 passing through openings 94 in the reflector 60 aligned with openings 96 in the plate to engage the tread 40 or 42.

The attachment means 92 may be any conventional means such as metal screws, rivets, or bolts and nuts for attaching one member to another. As best shown in FIG. 4, the plate 90 may also include a protective frame 100 along the proximal, distal, and bottom edges of the reflector 60. The frame could also extend along the top edge. The frame 100 includes a peripheral channel 102 having a width 104 sufficient for receiving and retaining the reflector 60 on the plate 90. The frame 100 may be made of various materials such as metal, plastic, or other rigid material, and may be provided either separately or along with the plate 90 as an integral part of the pedal 30. The reflector 60 might also be enclosed by a protective housing made of expoxy, plastic, or other material which would allow the reflector 60 to be snapped or melted together with the housing. It will be appreciated that various other means for mounting the reflector 60 to the pedal 30, such as, for example, glue or other adhesive materials, may be used without departing from the scope of the present invention.

Figure 5:
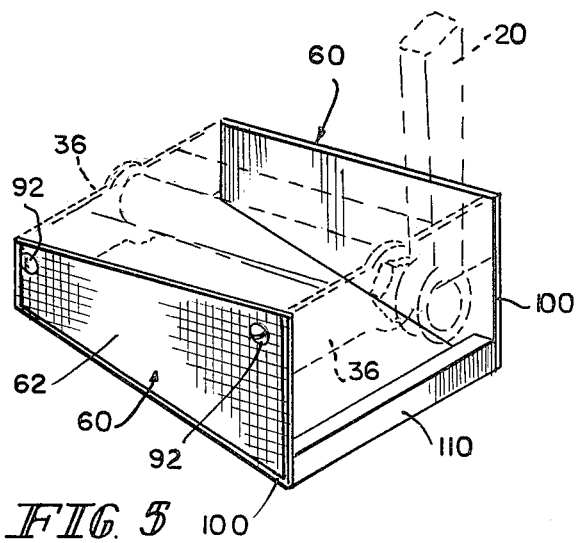
FIG. 5 is a perspective view of another embodiment of a pedal reflector constructed according to the present invention diagrammatically shown mounted to a pedal assembly.

Referring to FIG. 5, a reinforcement brace 110 may be connected between two reflectors 60 mounted to the rear and front treads 40 and 46, respectively, of the pedal 30 to prevent the downwardly extending portions of the reflectors 60 from flexing or being permanently bent. Other reinforcement braces or brackets could also be used to strengthen the reflectors 60 and the mounting means therefor.

Figure 6:
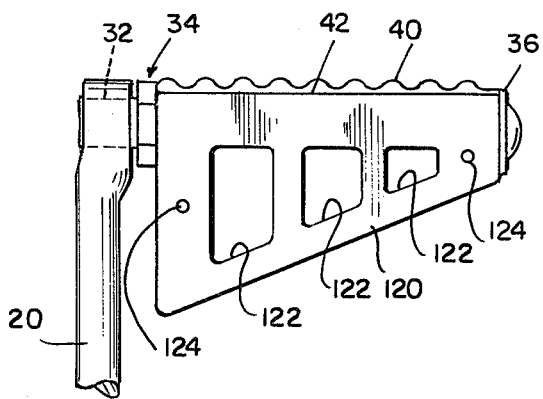
FIG. 6 is a rear view of a pedal assembly showing an embodiment of a mounting plate for a pedal reflector embodying the present invention.

Referring to FIG. 6, another embodiment of a mounting plate 120 includes a series of areas 122 where material used to make the plate 120 has been removed from the plate 120 in order to decrease its weight. This feature might be particularly applicable where the plate 120 is made of metal. As shown in FIG. 6, the plate 120 may be attached to the rear facing surface 42 of a rear tread 40 of the pedal 30 by means such as glue. The plate 120 might also include two openings 124 for receiving protrusions (not shown) on the back of reflector 60 to align the reflector 60 relative to the mounting plate 120. Reflector 60, therefore, may also be attached to the plate 120 using an adhesive material.

Shown in FIG. 7 is another embodiment of a reflector 150 constructed according to the present invention. The reflector 150 includes a plurality of reflector members which are interconnected to form a reflector unit which is then mounted to a pedal 30. The reflector unit 150 includes a frame structure 152 similar to that shown in FIG. 4 either with or without the plate 90. The frame structure 152 serves as connecting means for the various reflector members of the reflector unit 150. The reflector unit 150 includes front and rear reflectors 60, each having a trapezoidal shape and each being constructed in the manner described above and shown in FIG. 3. The reflector unit 150 also includes one or more side reflectors. Although the embodiment shown in FIG. 7 includes three side reflector members, it will be appreciated that one, two, or three side reflectors may be used, and further that only a single front or rear trapezoidal-shaped reflector 60 may be used without departing from the scope of the present invention.

Continuing to refer to FIG. 7, the reflector unit 150 shown includes an outside reflector 154 connected to the distal edges 78, as seen in FIG. 3, of the trapezoidal reflectors 60. In the preferred embodiment, the side reflector 154 is rectangular and has a rectangular reflective surface area 156 having a height of 1 inch and a length of 3 inches. Thus, the effective reflective surface area 156 of the side reflector 154 is approximately 3 square inches.

The reflector unit 150 shown in FIG. 7 also includes a bottom reflector 160 connected to the bottom edges 82, as seen in FIG. 3, of the trapezoidal reflectors 60. The bottom reflector 160 is rectangular and has a rectangular reflective surface area 162 having two sides with lengths generally equal to the length of the bottom edges 82 of the trapezoidal reflectors 60 and two sides with lengths generally equal to the length of the side reflector 154. As best seen in FIGS. 3 and 7, the bottom reflector 160 forms the same acute angle 86 with respect to the proximal edges 76 of reflectors 60 as the bottom edges 82. Thus, the dotted lines in FIG. 7 represent an effective reflective surface area 164 from the side of the reflective unit 150. The effective side reflective surface area 164 has a height 166 of 1.25 inches and a length 168 of 3.0 inches. Thus, the effective side reflective surface area 164 produced by bottom reflector 160 is generally equal to 4.2 square inches. Viewing the reflective unit 150 from the side in a directino transverse to the reflector 154, it can be seen that the side reflector 154 and the bottom reflector 160 produce a total effective side reflective surface area which equals the combination of the effective reflective surface area 156 of the side reflector 154 and the effective side reflective surface area 164 of the bottom reflector 160. Thus, the reflector unit 150 provides a maximum outside reflective surface area (area 156 plus area 164) without affecting the minimum tilt angle 50 of the bicycle 10 relative to the ground surface 18.

The reflector unit 150 shown in FIG. 7 also includes a second side reflector 170 connected to the proximal edges 72, as seen in FIG. 3, of the trapezoidal reflectors 60. The second side reflector 170 is rectangular and has a rectangular reflective surface area 172. The reflector 170 includes an upwardly opening notch 174 for receiving the pedal shaft 32 when the reflector unit 150 is mounted to the pedal 30. As best seen in FIGS. 3 and 7, the effective reflective surface area 172 of the side reflector 170 has a height generally equal to the length 72 of the proximal edge 70 of the trapezoidal reflector 60 and a length generally equal to the length of the side reflector 154.

The reflector unit 150 is mounted to the pedal 30 by placing the pedal 30 inside the upwardly opening interior 176 of the unit 150 and attaching the rear and front trapezoidal reflectors 60 to the rear facing pedal surface 42 and front facing pedal surface 46, respectively. The unit 150 may be attached using screws, bolts, rivets, or other means inserted through holes 178 provided in the reflectors 60.

Referring to FIG. 8, another embodiment of a reflector according to the present invention is shown which achieves a maximum reflective surface area without affecting the minimum tilt angle 50 of the bicycle 10 relative to the ground surface 18. The reflector shown in FIG. 8 includes a rectangular reflector member 180 having an effective reflective surface area 182 which is either equal to or greater than the reflective surface area of conventional pedal reflectors heretofore mounted to the treads 40 and 44 of the pedals 30. For example, reflector 180 may have a reflective surface area 182 equal to between 1 to 3.5 square inches.

The reflector shown in FIG. 8 also includes a reflector member 184 which has a triangular shape. The reflector member 184 has a front and rear reflective surface area 186 and is attached to the spindle 38 of the pedal 30 so that it extends downwardly below the bottom of the pedal 30. Attachment means 188 may include straps. Other attachment means 188 may also be used without departing from the scope of the present invention. It will be appreciated that reflector 184 has a shape similar to the bottom portion of the reflector 60 shown in FIG. 3. Thus, the bottom edge of reflector 184 forms an acute angle with the proximal edge thereof, and this acute angle is generally equal to the minimum tilt angle 50 of the bicycle 10 relative to the ground surface 18. In a preferred embodiment, the reflective surface area 186 is generally equal to 2 square inches. Thus, in accordance with the present invention, the total effective front and rear reflective surface area equals the reflective surface area 182 of the rectangular reflector member 180 plus the reflective surface area 186 of the triangular reflector member 184. A maximum reflective surface area (area 182 plus area 186) is provided without affecting the minimum tilt angle 50 of the bicycle 10 with respect to the ground surface 18.

Referring to FIGS. 9 and 10, pedals 30 sometimes include teo clips 190 for receiving and retaining the toe portion of the rider's foot. In such pedal designs, another embodiment of a reflector constructed according to the present invention can be provided which includes a reflector 192 having a substantially greater reflective surface area 194 than prior pedal reflectors facing toward the front of the bicycle 10. The reflector 192 has trapezoidal shape, and thus has a construction similar to that of the reflector 60 shown in FIG. 3. However, the proximal and distal edges of the reflector 192, shown in FIGS. 9 and 10, are elongated to increase the height of reflector 192. The increased reflective surface area 194 extends above the top 202 of the pedal 30. As previously described, reflector 192 is mounted to the toe clip 190. The reflective surface area 194 could be bifurcated into two sections at an angle to each other, while maintaining the trapezoidal shape, as best shown in FIG. 9 by the dotted lines. A mounting plate 196 having a peripheral frame 198 for receiving the reflector 192 may be used to mount the reflector 192 to the toe clip 190. The plate 196 may be attached to the toe clip 190 by various means, such as, for example, a bolt and nut, as shown in FIG. 9. The distinct trapezoidal shape of the reflector 192 again produces a maximum reflective surface area 194 without affecting the minimum tilt angle 50 of the bicycle 10 relative to the ground surface 18.

Figure 11:
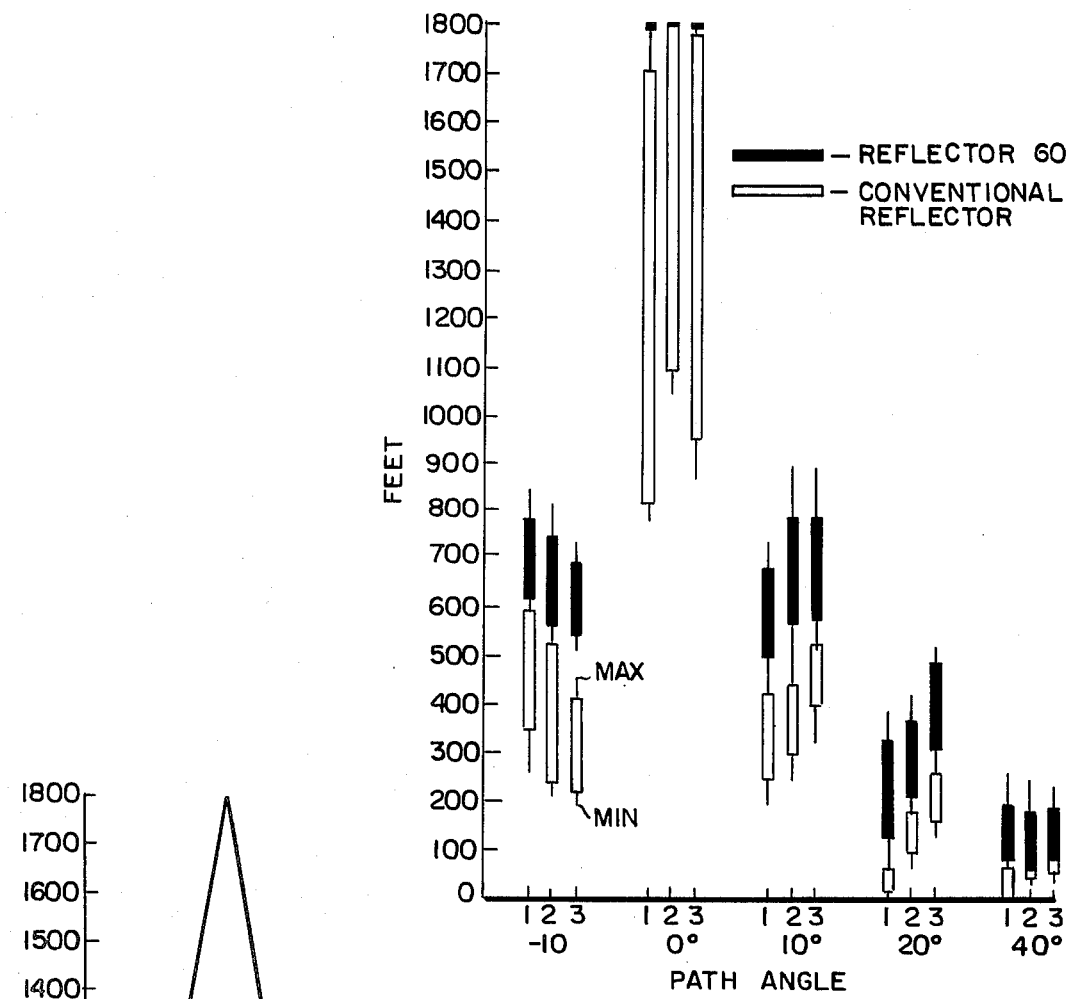
FIG. 11 is a graphic summary of a comparison of detection distances for a conventional pedal reflector and a pedal reflector embodying the present invention.

Referring to FIGS. 11-14, a study was conducted to compare the effectiveness of a pair of amber pedal reflectors 60 embodying the present invention to a conventional pair of amber pedal reflectors by testing both the pedal reflector 60 and the conventional pedal reflector in simulated driving situations. Both pedal reflectors, i.e., the pedal reflector 60 embodying the present invention and the conventional pedal reflector, were tested equally under similar conditions. As shown in FIGS. 11-13, the study established that the pedal reflector 60 embodying the present invention produces better detection results than the conventional pedal reflector for bicycle safety and presents an economically feasible alternative to the conventional pedal reflector.

In the study, a 26-inch wheel height bicycle was used. The conventional rectangular pedal reflector had a length of 2.5 inches and a height of 0.375 inch, providing an effective reflective surface area of 0.9375 square inch. The trapezoidal reflector 60 embodying the present invention had a top edge measuring 4 inches, a proximal edge measuring 2.25 inches, and a distal edge measuring 1 inch, thus producing an effective reflective surface area of 6.5 square inches. The trapezoidal reflector 60 has a reflective surface area which was 6.93 times greater than the reflective surface area of the conventional rectangular reflector.

A line of travel for a vehicle with three paths in which reflectors and bicycles are normally presented to the driver of a vehicle was set up at a test site for the study. All of the paths were parallel to the line of travel. Path 1 was 12.5 feet to the left of the line of travel, path 2 was 6.25 feet to the right of the line fo travel, and path 3 was 25 feet to the right of the line of travel. The front of the car was aligned with the line of travel with heading angles of −10° (the vehicle axis aimed 10° to the left of the line of travel), 0° (the vehicle axis aimed along the line of travel), 10°, 20°, and 40°. For each heading angle, fifteen observations of both the pedal reflector 60 and the conventional pedal reflector were made along each path. It should be noted that the length of the test site was limited to 1800 feet and thus detection distances in the paths at the 0° heading angle were limited to this distance for the pedal reflector 60. FIG. 11 is a graphic comparison of maximum and minimum detection distances for the fifteen observations in each path at each heading angle for the pedal reflector 60 embodying the present invention (represented by the lines connected to the dark bars) and the conventional pedal rectangular reflector (represented by the lines connected to the light bars).

The graphs in FIGS. 12-14 contrast the mean detection distances for the pedal reflector 60 embodying the present invention and the conventional reflector for each path at each heading angle plotted in the graph shown in FIG. 11. In FIGS. 12-14, the mean detection distances for fifteen observations of the pedal reflector 60 embodying the present invention are represented by the solid line, and the mean detection distances for fifteen observations of the conventional reflector are represented by the broken lines. These graphs clearly substantiate the fact that the detection distance for the pedal reflector 60 embodying the present invention for each path at every heading angle is greater than the detection distance for the conventional pedal reflector for the same path and heading angle. These graphs show that the pedal reflector 60 embodying the present invention is detectable at a greater distance from the vehicle than the conventional pedal reflector.

From the graphs shown in FIGS. 12-14, it is apparent that for heading angles −10°, 10°, and 20°, the detection distance for the reflector 60 embodying the present invention is between 200 to 300 feet greater than that of the conventional pedal reflector. For the 0° heading angle, a difference of approximately 300 feet to 600 feet between detection distances of the two pedal reflectors is apparent.

One characteristic shown in the graph in FIG. 11 is that the minimum distance for detecting pedal reflector 60 embodying the present invention is well above the mean distance for detecting the conventional pedal reflector in most cases, and even above the maximum distance for detecting the conventional pedal reflector in some cases. The fact that the minimum detection distance of the pedal reflector 60 is in most cases above the mean detection distance for the conventional pedal reflector shows an increase in safety associated with the pedal reflector 60 for the worst possible condition.

From the results of this study and the statistical analysis of such results represented in the graphs shown in FIGS. 11-14, it is apparent that pedal reflector 60 increases bicycle safety. An embodiment of a reflector constructed according to the present invention is not a difficult or expensive change to incorporate into existing bicycles. Economically, it is considerably less expensive to incorporate a reflector embodying the present invention than other reflectors or bicycle lighting systems. Thus, a reflector 60 embodying the present invention provides a functional and economical alternative to conventional pedal reflectors which is inexpensive to manufacture and easy to install. The reflector 60 provides a maximum reflective surface area 62 without any effect upon the minimum tilt angle 80 of the bicycle 10 with respect to the ground surface 18.

What is claimed is:

1. A reflector for a pedal mounted to the crank of a bicycle, the pedal having front and rear facing pedal surfaces, the reflector comprising a reflectorized member having a reflective area greater than one of the front and rear facing pedal surfaces, and mounting means for mounting the reflectorized member on the one pedal surface, the reflectorized member including a proximal side adjacent to the crank when mounted on the one pedal surface and a bottom forming an acute angle with respect to the proximal side.

2. The reflector of claim 1 wherein the reflectorized member is trapezoidal-shaped.

3. The reflector of claim 2 wherein the reflectorized member includes a distal side, the distal side having a length less than the proximal side and forming an obtuse angle with respect to the bottom.

4. The reflector of claim 3 wherein the mounting means includes a protective frame for retaining the reflectorized member and connecting means for securing the frame and reflectorized member to the said one pedal surface.

5. The reflector of claim 1 wherein the reflectorized member is mounted to the front facing pedal surface.

6. The reflector of claim 1 wherein the reflectorized member is mounted to the rear facing pedal surface.

7. The reflector of claim 1, further comprising a second reflectorized member, one reflectorized member being mounted to the front facing pedal surface, the other reflectorized member being mounted to the rear facing pedal surface.

8. A reflectorized pedal assembly for a bicycle having a frame generally in a single plane and a crank rotatably mounted on the frame, comprising a pedal shaft, coupling means for coupling the pedal shaft to the crank, a pedal frame, first mounting means for rotatably mounting the pedal frame to the pedal shaft, pedal treads providing front and rear facing pedal surface areas, second mounting means for mounting the treads to the pedal frame, reflectorized means on at least one of the front and rear facing pedal surface areas, the reflective means having a reflective surface area greater than the said one pedal surface area, and including a bottom forming an acute angle with respect to the plane of the frame when the pedal shaft is mounted to the crank.

9. A reflector for a pedal mounted to the crank of a bicycle, the pedal having front and rear facing pedal surface areas, the reflector comprising reflectorized means having a generally trapezoidal shape, the reflectorized means including a reflective surface area greater than one of the front and rear facing pedal surface areas, mounting means for mounting the reflectorized means on the pedal so that the reflective surface area extends downwardly below the pedal.

10. The reflector of claim 9 wherein the reflectorized means includes a first portion providing a first reflective area at least equal to the said one pedal surface area and a second portion providing a second reflective area below the said one pedal surface area.

11. The reflector of claim 10 wherein the second portion of the reflectorized means includes a proximal side adjacent to the crank when the reflectorized means is mounted on the pedal and a bottom forming an acute angle with respect to the proximal side.

12. A reflector for a pedal mounted to the crank of a bicycle, the pedal having side frame members rotatably mounted to the crank, and pedal platforms mounted transverse to the side frame members, the pedal platforms providing front and rear facing pedal surfaces, the reflector comprising a first reflectorized member, a second reflectorized member, a third reflectorized member, mounting means for mounting the reflectorized members on the pedal, each of the first and second reflectorized members having proximal sides adjacent to the crank when mounted on the pedal, a distal side, and a bottom forming an acute angle with respect to the proximal side, connecting means for connecting the third reflectorized member to one of the sides of both first and second reflectorized members, thereby providing a reflectorized unit having front, rear, and side reflective surface areas.

13. The reflector of claim 12 wherein the first and second reflectorized members have a generally trapezoidal shape.

14. The reflector of claim 13 wherein the third reflectorized member has a generally rectangular shape.

15. The reflector of claim 12 wherein the third reflectorized member is connected to the bottoms of the first and second reflectorized members.

16. The reflector of claim 15, further comprising a fourth reflectorized member and second connecting means for connecting the fourth reflectorized member to one of the sides of the first and second reflectorized members.

17. The reflector of claim 16, further comprising a fifth reflectorized member and third connecting means for connecting the fifth reflectorized member to the other side of the first and second reflectorized members.

18. The reflector of claim 12 wherein the third reflectorized member is connected to one of the sides of the first and second reflectorized members.

* * * * *